J. DARLING & J. W. CULBERTSON.
REVERSING PULLEY MECHANISM.
APPLICATION FILED JULY 11, 1908.
915,564.
Patented Mar. 16, 1909.
3 SHEETS—SHEET 1.
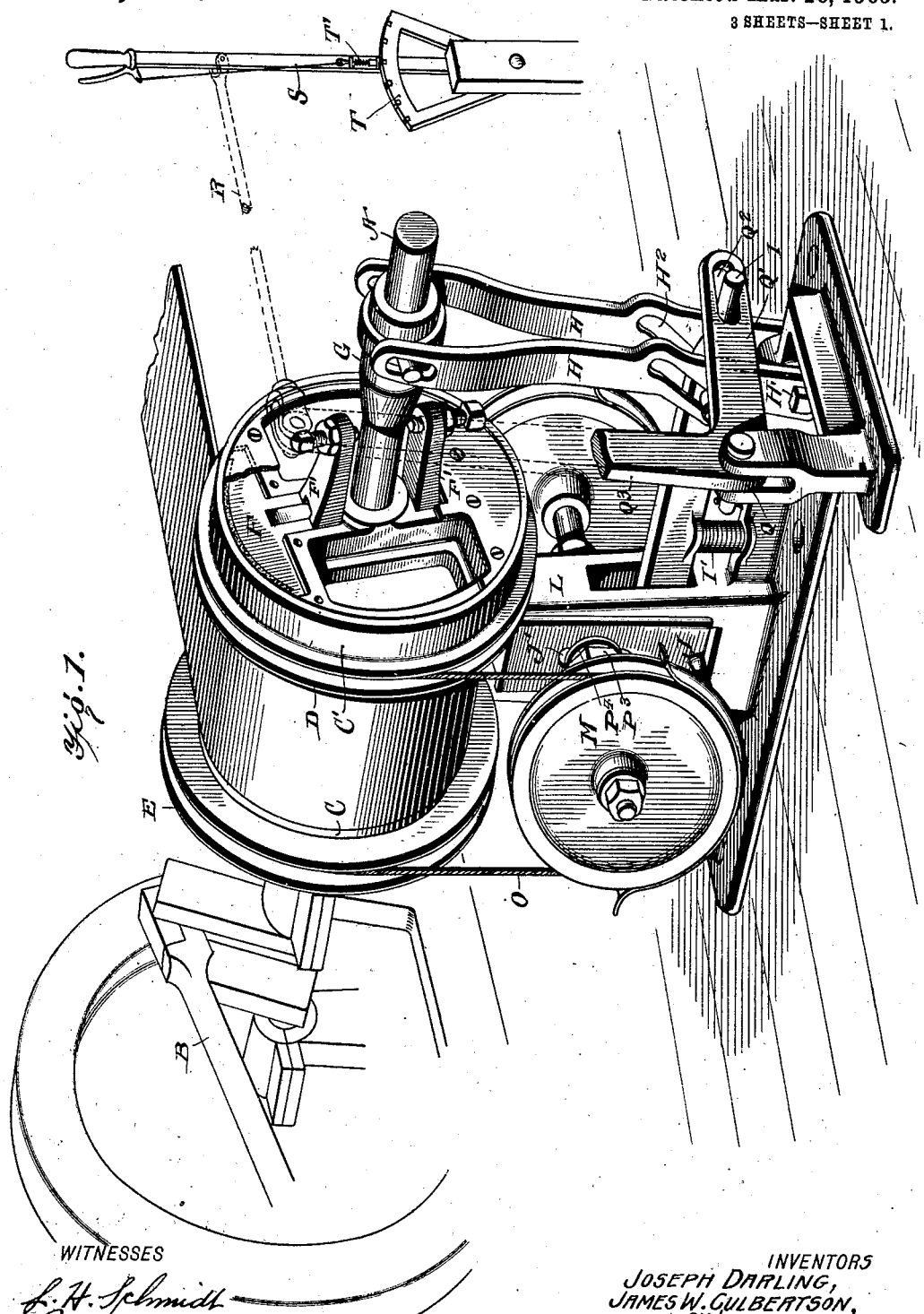
WITNESSES
INVENTORS
JOSEPH DARLING,
JAMES W. CULBERTSON,
BY
ATTORNEYS.

J. DARLING & J. W. CULBERTSON.
REVERSING PULLEY MECHANISM.
APPLICATION FILED JULY 11, 1908.
915,564.
Patented Mar. 16, 1909.
3 SHEETS—SHEET 2.
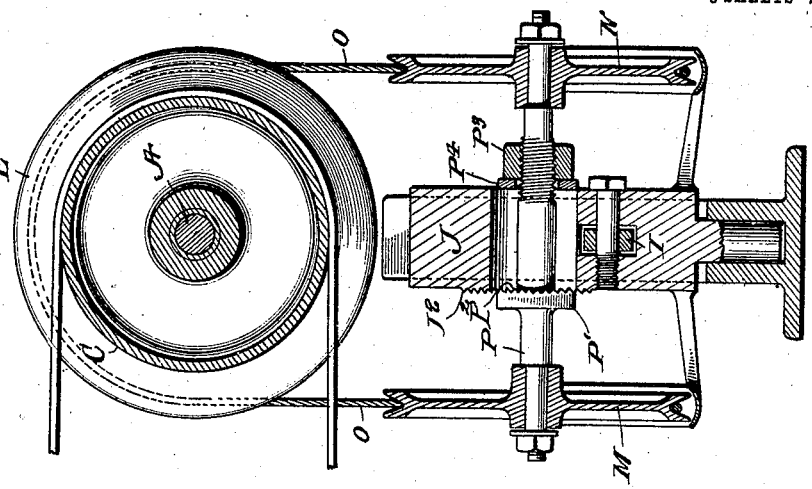
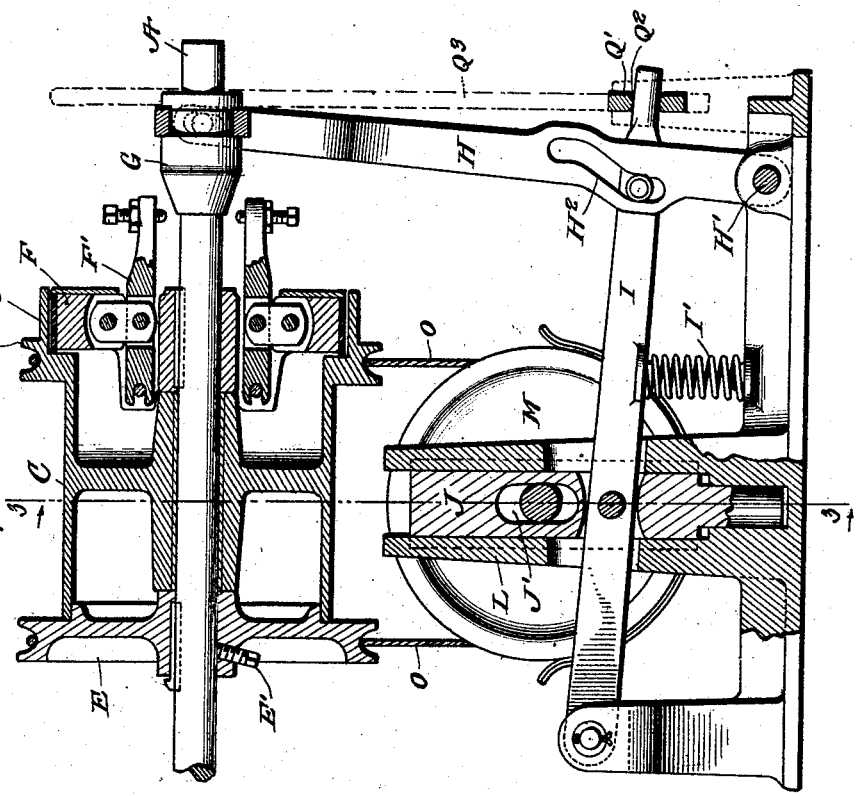
WITNESSES
L. H. Schmidt
Perry B. Turpin
INVENTORS.
JOSEPH DARLING,
JAMES W. CULBERTSON,
BY Munn & Co.
ATTORNEYS.

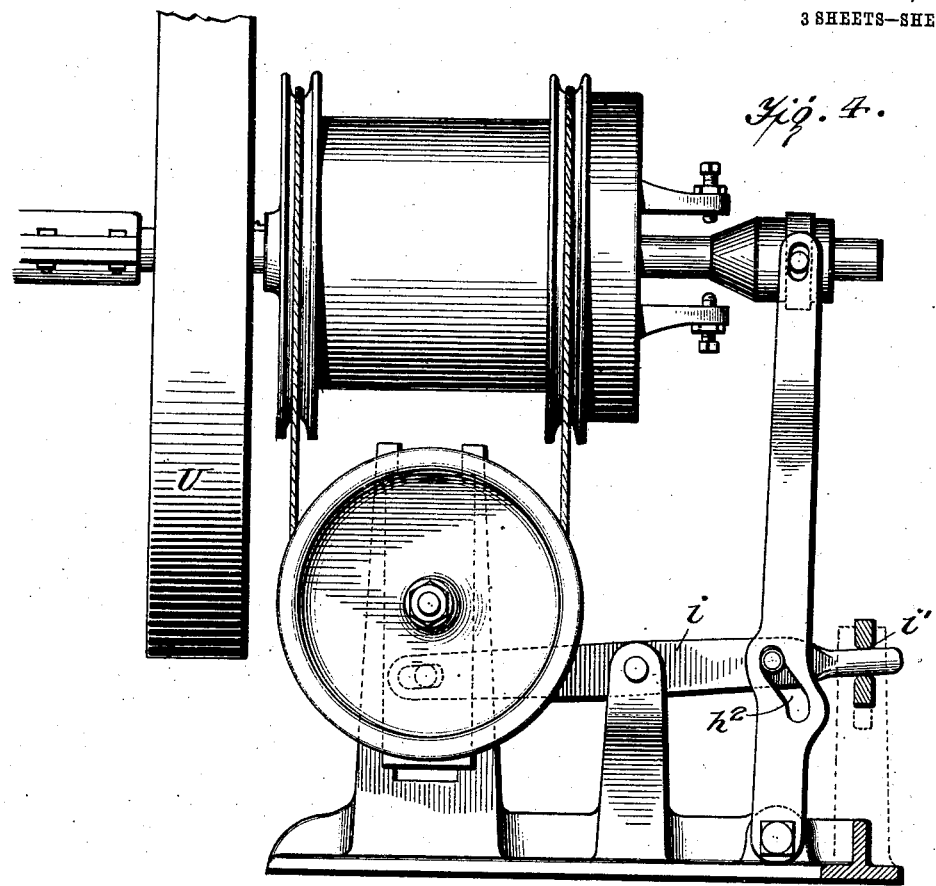

UNITED STATES PATENT OFFICE.

JOSEPH DARLING, OF CHICORA, AND JAMES WILSON CULBERTSON, OF KNOX, PENNSYLVANIA.

REVERSING-PULLEY MECHANISM.

No. 915,564.      Specification of Letters Patent.      Patented March 16, 1909.

Application filed July 11, 1908. Serial No. 443,096.

*To all whom it may concern:*

Be it known that we, JOSEPH DARLING and JAMES WILSON CULBERTSON, citizens of the United States, and residents, respectively, of Chicora, in the county of Butler and State of Pennsylvania, and of Knox, in the county of Clarion and State of Pennsylvania, have invented certain new and useful Improvements in Reversing-Pulley Mechanism, of which the following is a specification.

This invention is an improvement in reversing pulleys especially designed and adapted for use in connection with non-reversible engines, whether gas engines or others used about oil wells; but the invention is capable of use for other purposes such as various forms of machines in which it is desired to operate driving wheels or pulleys in one direction and at other times in the other direction; and the invention consists in certain novel constructions and combinations of parts as will be hereinafter described and claimed.

In the drawings, Figure 1 is a perspective view of an apparatus embodying our invention. Fig. 2 is a vertical longitudinal section, and Fig. 3 is a cross section on about line 3—3 of Fig. 2. Fig. 4 is a vertical longitudinal section illustrating a somewhat modified construction.

In the construction shown the shaft A is driven by an engine of any suitable type, a part of an engine being illustrated at B in connection with the shaft A. This engine operates the shaft A continuously in one direction. The purpose of the invention is to transmit to the drum C the motion of the shaft A, and to turn the said drum in one direction or the other without reversing the shaft A.

The drum C may be of the ordinary pulley form shown, to receive the flat belt or it may be adapted to receive any other form of belt without departing from any of the principles of the invention, and this drum C is in fixed relation with the pulley D, the said pulley and the drum being normally loose on the shaft A, and at the opposite end of the drum C from the pulley D we provide a pulley E, which latter is fast on the shaft A, which may be effected by a screw E' as shown in Fig. 2, or in any other suitable manner.

A clutch mechanism is provided for keying the drum C to the shaft A whenever desired, and this clutch comprises in the construction shown blocks F movable radially within a sleeve extension C' of the drum C and operated by levers F', which in turn are operated by a conical sleeve G which is loose on and movable along the shaft A so it can be moved from the position shown in Fig. 2, to the left by the action of the lever mechanism presently described to spread the arms F' and force the blocks F into binding contact with the extension C' of the drum. When the sleeve G is operated to clutch the drum C on the shaft the said drum will be turned in the same direction as the shaft by the direct action thereof.

The sleeve G is operated by a lever H which latter is pivoted at its lower end H', connected near its upper end with the sleeve G by means of a collar loose on said sleeve and operates between its ends by a cam portion at $H^2$ upon a lever I in such manner as to lift the lever I when the lever H is moved to turn the clutch into engagement with the drum C and to lower the said lever I when the lever H is moved to the position shown in Fig. 2. This operation of the lever I raises and lowers a belt tightening mechanism which includes a carrier J movable vertically in a suitable stand L and supporting at its opposite sides idler pulleys M and N which receive a belt O disposed around the said idler pulleys M and N and around the pulleys E and D as shown in Figs. 1, 2 and 3 of the drawings. A spring I' below the lever tends to compensate for the weight of the said lever in operation, and it is preferred to connect the pulleys M and N with the carrier J in such manner as to permit an adjustment of the said pulleys in order to secure the desired tension of the belt O. It is understood that this belt O may be of any suitable form or material, such as a cable or chain as may be found desirable in the practical use to which the mechanism is applied.

In securing the adjustment of the pulleys M and N it is preferred to slot the carrier J vertically at J', and to pass the shaft P carrying the pulleys M and N through the said slot. On the shaft P is formed a collar P' serrated at $P^2$ to match corresponding serrations $J^2$ on the carrier J at one side of the latter, a screw nut $P^3$, and a washer $P^4$ being provided on the shaft on the opposite side of the carrier J to secure the shaft and carrier in interlocked relation when properly adjusted. This construction is best shown in Fig. 3 of the drawings. In the operation of the described construction, when the parts are in the position shown in Fig. 2, the carrier J will be lowered by its gravity and then the pulleys M and N and the belt O will be tightened in such manner as to be driven by the pulley E, and the motion of the shaft A will be transmitted through the pulley E and the belt O to the pulley D and thus drive the drum C in the reverse direction from that of the shaft A. On the other hand when the lever H is operated from the position shown in Fig. 2 to the left to clutch the drum C to the shaft A, the same movement will through the lever I lift the carrier J and the idlers M and N in such manner as to slacken the belt O so it will not be driven by the pulley E as the drum C is moved in the opposite direction by the direct action of the shaft A. The said pulley E will in such operation slide within the belt O, the latter being ineffective except when tightened by the belt tightening mechanism before described. By this construction it will be noticed we are able to drive the drum C in one direction or the other and in doing so we tighten the belt which connects the shaft pulley E with the drum pulley D for driving the drum in a direction the reverse of the shaft A, while for turning the drum in the same direction as the shaft A we slack the said belt and at the same time clutch the drum to the shaft A by the mechanism before described.

The lever H is preferably operated through the lever I by means of a bell crank lever Q whose arm Q' connects at Q² with the swinging end of the lever I and whose arm Q³ may be operated directly if desired or may be operated by means of a pitman rod R from a hand lever S which latter may be at any suitable distance from the reversing mechanism. This hand lever S operates along a rack T, and is provided with a pawl T' by which it may be secured in any one of three positions, the neutral or intermediate position retaining the parts in position to slacken the chain O without clutching the drum to the shaft, and the end positions tightening the belt and releasing the clutch in one position or slackening the belt and clutching the drum on the shaft in the other position as before described.

In Fig. 4 we show a somewhat similar construction to that shown in Fig. 2, it being noticed, however, that in Fig. 4 we show a different form of lever from that shown in Fig. 2, the lever i in Fig. 4 being pivoted between its ends and connected at one end with the carrier for the idler pulleys, and at its other end at i' with the bell crank lever, the cam slot at h² being also reversed relatively to the construction shown in Fig. 2, so that in operating the tightened clutch within the drum the idler pulleys will be raised in the construction shown in Fig. 4 to slacken the belt O. This construction shown in Fig. 4 will be found useful when it is desired to arrange a fly wheel U adjacent to the pulley E.

We claim—

1. The improvement herein described comprising a shaft, a drum loose on the shaft and having a pulley, a pulley turning with the shaft, a pair of idler pulleys, a belt passing around said idler pulleys and around the drum pulley and the shaft pulley, a movable carrier for said idler pulleys whereby they may be set toward and from the drum and shaft pulleys to slacken and tighten the belt, mechanism for moving the carrier toward and from the drum, a clutch on the shaft for keying the drum thereto, and means for operating said clutch and the carrier moving mechanism in unison whereby the drum may be clutched to the shaft when the belt is slackened and may be freed from the shaft when the belt is tightened substantially as set forth.

2. The combination with a shaft, a pulley fixed to the shaft, a drum loose on the shaft and having a pulley, idler pulleys, and a belt connecting the same with the drum and shaft pulleys, of means for moving said idler pulleys to slacken and tighten the belt, and mechanism whereby the drum may be keyed to the shaft at will, substantially as set forth.

3. The combination with a shaft, a pulley fast on the shaft, and a drum loose on the shaft and having a pulley, a clutch mechanism between the drum and shaft, a belt passing around the shaft pulley and the drum pulley, idler pulleys on the said belt, and means for tightening the belt, all substantially as set forth.

4. The combination of a shaft, a pulley fast on the shaft, a drum loose on the shaft and having a pulley, a clutch for keying the drum to the shaft, a belt passing around the shaft and drum pulleys, idler pulleys receiving said belt, a carrier for said idler pulleys movable toward and from the drum, a lever for moving the said carrier, a lever for operating the clutch and having a cam connection with the carrier operating lever, and a lever operating upon the carrier lever whereby to move the carrier toward and from the drum, substantially as set forth.

5. The combination with the shaft and a pulley fast thereon, of a drum loose on the shaft and having a pulley, a belt connection between the shaft pulley and the drum pulley, a belt tightening mechanism in connection with said shaft whereby the belt may be tightened to drive the drum pulley from the shaft pulley, of a clutch mechanism for keying the drum to the shaft, and means for operating the clutch and the belt tightening mechanism whereby the drum may be clutched to the shaft when the belt is slack and unclutched when the belt is tight, substantially as set forth.

6. The combination with the shaft, a pulley fast thereon, and a drum loose on the shaft and having a pulley of a clutch for keying the drum to the shaft, a belt passing around the shaft and drum pulleys, idler pulleys receiving said belt, a carrier for said idler pulleys, a lever for operating said carrier, and a clutch operating lever having cam connection with the carrier operating lever, substantially as set forth.

7. The combination with the shaft, a pulley fast thereon, a drum loose on the shaft and having a pulley, and mechanism for clutching the drum to the shaft, of a belt passing around the shaft and drum pulleys, idler pulleys receiving the said belt, a carrier for said pulleys and movable toward and from the drum, means for securing the pulleys to the said carrier in different adjustments, and means for operating the carrier, substantially as set forth.

8. The combination with a shaft, and a pulley fast on the shaft, of a drum loose on the shaft and having a pulley, a belt between the shaft pulley and the drum pulley, idlers in said belt and movable toward and from the drum, a clutch for keying the drum to the shaft, means for moving the idlers toward and from the drum to slacken and tighten the belt, and a clutch operating mechanism operated from said means, substantially as set forth.

JOSEPH DARLING.
JAMES WILSON CULBERTSON.

Witnesses to the signature of Joseph Darling:
SOLON C. KEMON,
PERRY B. TURPIN.

Witnesses to the signature of James Wilson Culbertson:
AUSBY L. LOWE,
ALFRED H. JONES.